United States Patent
Angelo et al.

(10) Patent No.: US 9,535,495 B2
(45) Date of Patent: Jan. 3, 2017

(54) INTERACTING WITH A DISPLAY POSITIONING SYSTEM

(71) Applicant: International Business Machines Corporation, Armonk, NY (US)

(72) Inventors: Jesse R. Angelo, Brooklyn, NY (US); Craig J. Limoli, Warren, NJ (US); William H. Plaehn, New York, NY (US); Kelly E. Songer, St. Kilda (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/497,408

(22) Filed: Sep. 26, 2014

(65) Prior Publication Data

US 2016/0091968 A1    Mar. 31, 2016

(51) Int. Cl.
*G06F 3/01* (2006.01)
*G06F 3/0484* (2013.01)

(52) U.S. Cl.
CPC ............... *G06F 3/011* (2013.01); *G06F 3/017* (2013.01); *G06F 3/04845* (2013.01); *G06F 2203/04803* (2013.01)

(58) Field of Classification Search
CPC ........................................................ G06F 3/013
USPC .................................... 345/1.3; 715/700–866
See application file for complete search history.

(56) References Cited

U.S. PATENT DOCUMENTS

| | | | |
|---|---|---|---|
| 8,379,059 B2 | 2/2013 | Shih et al. | |
| 2002/0149613 A1* | 10/2002 | Gutta | G06F 3/011 715/728 |
| 2004/0075639 A1* | 4/2004 | Lester | B60R 11/0235 345/156 |
| 2008/0129686 A1 | 6/2008 | Han | |
| 2009/0201165 A1* | 8/2009 | Hwang | F16M 11/08 340/686.1 |
| 2009/0249245 A1* | 10/2009 | Watanabe | G06F 1/1616 715/802 |
| 2011/0078161 A1 | 3/2011 | Tran et al. | |
| 2011/0296043 A1 | 12/2011 | Sutton et al. | |
| 2012/0102436 A1 | 4/2012 | Nurmi | |
| 2012/0242571 A1 | 9/2012 | Takamura et al. | |
| 2013/0057571 A1 | 3/2013 | Harris | |
| 2013/0073980 A1 | 3/2013 | Amendolagine et al. | |
| 2013/0091440 A1 | 4/2013 | Kotler et al. | |
| 2013/0143651 A1 | 6/2013 | Harrison et al. | |
| 2013/0229333 A1 | 9/2013 | Schwartz et al. | |
| 2013/0318445 A1* | 11/2013 | Mitchell | G06F 3/041 715/744 |
| 2014/0118255 A1* | 5/2014 | Billerbeck | G06F 3/017 345/158 |

* cited by examiner

*Primary Examiner* — Michael Pervan
(74) *Attorney, Agent, or Firm* — Lance I. Hochhauser; David M. Quinn

(57) ABSTRACT

Display repositioning is provided. A viewer set is detected based, at least in part, on sensory data received from one or more sensors, wherein the viewer set includes one or more viewers of a display device. A location of the viewer set is determined relative to a screen of the display device based, at least in part, on the sensory data. A secondary interface element is presented via the screen, wherein the secondary interface element has a location based, at least in part, on the location of the viewer set and wherein the secondary interface element has a size based, at least in part, on the location of the viewer set.

20 Claims, 6 Drawing Sheets

INTERACTING WITH A DISPLAY POSITIONING SYSTEM

FIELD OF THE INVENTION

The present invention relates generally to the field of display positioning and more particularly, to adjusting the positioning of a display screen.

BACKGROUND OF THE INVENTION

In the context of display devices such as monitors and televisions, display orientation refers to the physical position of the screen in relation to the physical location of the viewer(s). Wall-mounted displays are used in a variety of settings including, but not limited to, at home, in public, in schools and in the workplace. There can be multiple viewers of a display at one time. For example, a billboard advertisement, a movie theater screen, a home television, or any other display is each viewed by multiple viewers at once. As another example, a number of customers in a shopping mall view an interactive map at the same time in order to learn the location of different attractions present at the mall.

Positioning a display can provide increased visibility of the screen by increasing the accuracy of a viewing direction for a user, which is the angle at which the user views the display. A viewing angle is the range of viewing directions from which a display can be viewed without artifacts, distortions, or other visual obstructions rendering its intended use impossible.

SUMMARY

According to one embodiment of the present disclosure, a method for display repositioning is provided. The method includes detecting, by one or more processors, a viewer set based, at least in part, on sensory data received from one or more sensors, wherein the viewer set includes one or more viewers of a display device; determining, by one or more processors, a location of the viewer set relative to a screen of the display device based, at least in part, on the sensory data; and presenting, by one or more processors, a secondary interface element via the screen, wherein the secondary interface element has a location based, at least in part, on the location of the viewer set and wherein the secondary interface element has a size based, at least in part, on the location of the viewer set.

According to another embodiment of the present disclosure, a computer program product for display repositioning is provided. The computer program product comprises a computer readable storage medium and program instructions stored on the computer readable storage medium. The program instructions include program instructions to detect a viewer set based, at least in part, on sensory data received from one or more sensors, wherein the viewer set includes one or more viewers of a display device; program instructions to determine a location of the viewer set relative to a screen of the display device based, at least in part, on the sensory data; and program instructions to present a secondary interface element via the screen, wherein the secondary interface element has a location based, at least in part, on the location of the viewer set and wherein the secondary interface element has a size based, at least in part, on the location of the viewer set.

According to another embodiment of the present disclosure, a computer system for display repositioning is provided. The computer system includes one or more computer processors, one or more computer readable storage media, and program instructions stored on the computer readable storage media for execution by at least one of the one or more processors. The program instructions include program instructions to detect a viewer set based, at least in part, on sensory data received from one or more sensors, wherein the viewer set includes one or more viewers of a display device; program instructions to determine a location of the viewer set relative to a screen of the display device based, at least in part, on the sensory data; and program instructions to present a secondary interface element via the screen, wherein the secondary interface element has a location based, at least in part, on the location of the viewer set and wherein the secondary interface element has a size based, at least in part, on the location of the viewer set.

DETAILED DESCRIPTION

Figure 1:
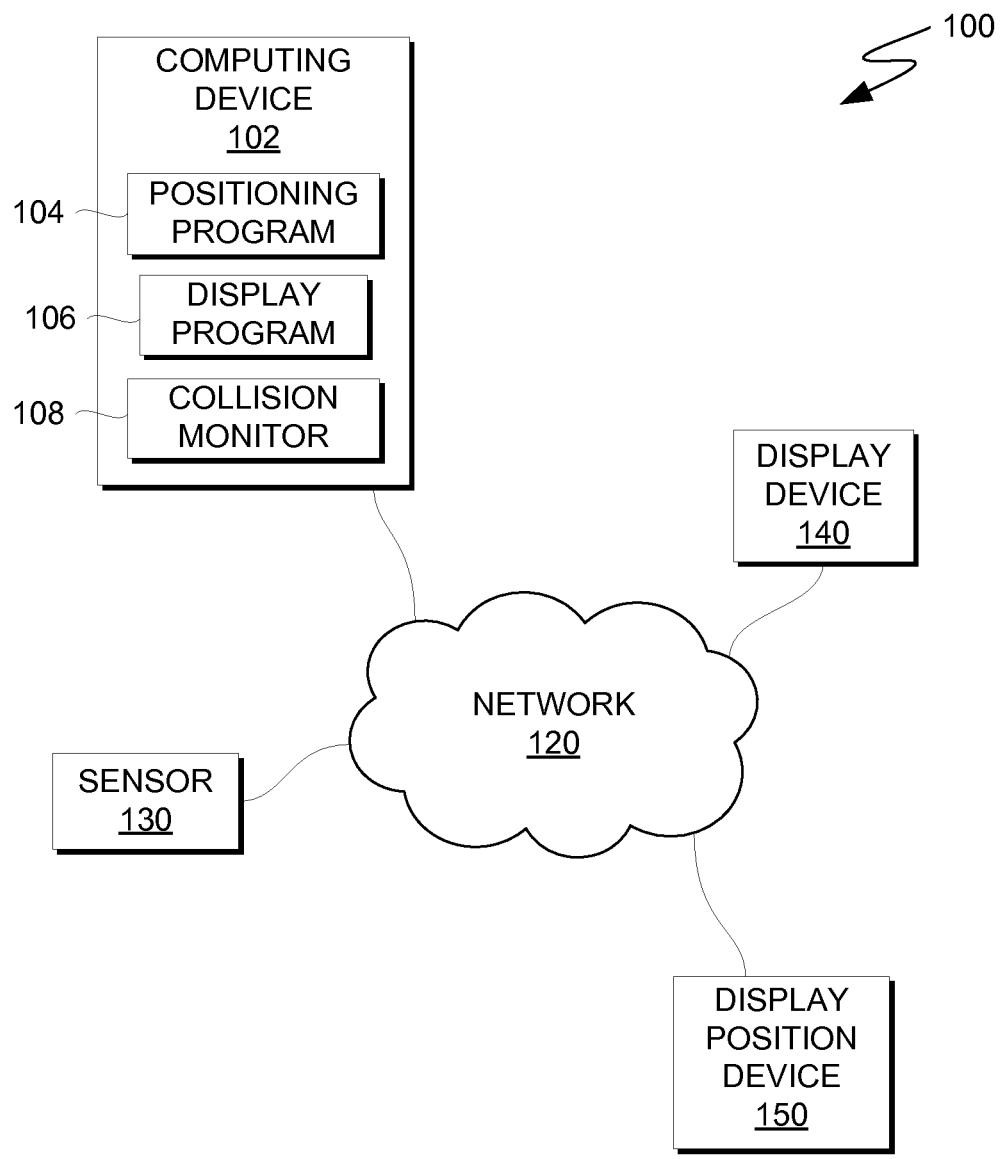
FIG. 1 is a functional block diagram illustrating a computing environment for display positioning, in accordance with an embodiment of the present disclosure.

Embodiments of the present disclosure recognize that display technology is ever-increasing in homes, workplaces, and elsewhere. Further recognized is that touch screen displays that are mounted to a wall are not generally well suited for user interaction. For example, a user often must approach the display in order to manipulate the position of a touch screen. Embodiments of the present disclosure recognize that many means exist to activate user manipulation of a display screen. Such means include adjusting the position of a display either manually or by using a motorized arm. Other means include adjusting the position of a display by way of remote control.

Embodiments of the present disclosure provide that a variety of methods exist for adjusting the display orientation. Some methods include adjusting a display position by way of a motorized arm. The user has the ability to position the screen by physically manipulating the position of the display either manually or by using the motorized arm. Other methods include manually adjusting a display position by hand or by way of a remote control. The user has the ability to select the exact position of the display screen by either physically manipulating the position of the screen by hand or selecting an option on a remote control.

Embodiments of the present invention recognize that a large display suitable to be viewed at a distance is not optimized for touch interaction, which occurs at a closer distance. For example, the text may be unsuitably large for up-close viewing and the on-screen elements may be unsuitably far apart for touch interactions. Embodiments of the present invention provide for displaying one or more elements via a screen of a display device. In one such embodiment, a session element is displayed for a set of viewers based on the proximity of the set of viewers to the display device. For example, the session element displays content with font sizes suitable for viewing at the distance of the viewer set and on-screen elements suitably positioned for touch interactions from the viewer set. Further, embodiments provide that a session element may be displayed over a background element, thereby allowing other viewers (being viewers other than the set of viewers corresponding to the session element) a minimally obstructed or unobstructed view of the other content of the display device. Further still, embodiments provide for repositioning the display device, one or more elements displayed via the screen of the display device, or both. Thus, embodiments of the present invention provide for improved usability of the display device, especially for multiple viewers or sets of viewers. Such embodiments are explained in further detail herein.

Embodiments of the present disclosure provide for interacting with a display in order to optimize the position of the screen, meaning that the screen faces a viewer at an angle preferred by a user (e.g., the viewer). Embodiments provide for receiving sensory input from at least one sensor (e.g., camera) in order to detect interactions in a variety of display positions. Embodiments of the present disclosure provide gesture recognition utilizing the sensory input from a camera. Further, embodiments provide one or more modes of operation (e.g., an active tracking mode, a free position mode, or both). In active tracking mode, the display positions (e.g., rotates, tilts, or otherwise moves) to adjust a viewing direction of a user, depending on the position of the user relative to the screen. In free position mode, the display positions (e.g., rotates, tilts, or otherwise moves) in response to gestures received from the user. In one embodiment, the display positions by articulation of a motorized arm. Further, embodiments provide an on-screen GUI (graphical user interface) which functions to receive interactions from a user that control the position of the display, for example, by selecting and saving preset positions. Further, embodiments of the present disclosure provide collision detection. In at least one embodiment, collision detection operates continuously in one or more modes of operation.

Embodiments of the present disclosure provide for displaying multiple viewing elements simultaneously. In one embodiment, display of a background element is overlaid with zero or more individual session elements. Each session element corresponds to a set of viewers (or a viewer set). Each session element is positioned over at least a portion of the background element. In some embodiments of the present disclosure, the scale and position of a session element is determined based on sensory input received from one or more sensors.

The present disclosure will now be described in detail with reference to the Figures. FIG. 1 is a functional block diagram illustrating computing environment 100, in accordance with an embodiment of the present disclosure. Computing environment 100 includes computing device 102, sensor 130, display device 140, and display position device 150. Computing device 102 includes positioning program 104, display program 106, and collision monitor 108.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to at least sensor 130 and display position device 150, and with access to and/or capable of executing positioning program 104, display program 106, and collision monitor 108. Computing device 102 may include internal and external hardware components, as depicted and described in further detail with respect to FIG. 6.

In this exemplary embodiment, positioning program 104 is stored on computing device 102. In other embodiments, positioning program 104 resides on another computing device, provided that positioning program 104 has access to and is accessible by display program 106, collision monitor 108, sensor 130, and display position device 150. In yet other embodiments, positioning program 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications with computing device 102 in accordance with a desired embodiment of the present invention.

Positioning program 104 operates to position a display device (e.g., display device 140). For example, positioning program 104 controls movements of display position device 150 to position display device 140. Positioning the display includes, for example, rotating, tilting, moving the display horizontally or vertically, moving the display closer to or further away from a viewer, or otherwise moving the display with respect to the user. In one embodiment, positioning program 104 positions a display device based on a position of a viewer. A viewer is an individual within a proximity of a display device (e.g., display device 140) detectable by a sensor (e.g., sensor 130). For example, a viewer is an individual viewing an image displayed by display device 140. In one embodiment, positioning program 104 monitors for a gesture, and, if positioning program 104 detects a gesture, then position program 104 validates the gesture. Positioning program 104 provides acknowledgement of the gesture (e.g., via display program 106). Positioning program 104 determines whether the gesture is cancelled. Positioning program 104 identifies a command based on the gesture. Positioning program 104 performs the identified command.

Display program 106 operates to display one or more display elements. For example, display program 106 displays a display element via a screen (or display surface) of display device 140. A display element is, in various embodiments, a background element or a session element. In one embodiment, display program 106 displays a background element. In another embodiment, display program 106 displays a background element and one or more session elements. For example, display program 106 displays a session element in front of (i.e., superimposed over) at least a portion of the background element. In this case, the session element is a layer displayed over the background element. The session element layer at least partially occludes visibility of the portion of the background element that the session element overlaps. In one embodiment, a portion of a first session element overlaps at least a portion of a second session element, in which case, the portion of the first session element at least partially occludes visibility of the portion of the second session element. In another embodiment, a session element does not overlap another session element. In this case, the session element is adjacent to, proximate to, or distant from the other session element. In one embodiment, a session element corresponds to a viewer set. In one embodiment, display program 106 presents a background element. Display program 106 detects a viewer set. Display program 106 determines a location of the viewer set. Display program 106 presents a session element corresponding to the viewer set. Display program 106 monitors for a gesture. In some embodiments, display program 106 invokes positioning program 104 to reposition the session element within the boundaries of the background element. In one embodiment, display program 106 detects a viewer set based on data received from one or more sensors (e.g., sensor 130).

Collision monitor 108 operates to help prevent collisions. In one embodiment, collision monitor 108 operates concurrently with one or both of positioning program 104 and display program 106. In another embodiment, collision monitor 108 operates while the display device is being repositioned (e.g., by positioning program 104). Collision monitor 108 receives data from one or more sensors (e.g., sensor 130). Based on the data, collision monitor 108 determines whether a collision is occurring (or, alternatively, whether a collision is imminent). In one embodiment, if collision monitor 108 determines that a collision is occurring (or imminent), then collision monitor 108 sends a collision alert to positioning program 104. For example, positioning program 104 moves a display device in a first direction. The display device includes one or more proximity sensors that detect the proximity of objects in the first direction. Collision monitor 108 receives proximity data from the one or more proximity sensors. In response to the proximity data indicating that an object is within two inches of the display device, collision monitor 108 sends a collision alert to positioning program 104. In response to receiving the collision alert, positioning program 104 ceases movement of the display device. Alternatively, positioning program 104 reverses (or otherwise adjusts) the direction of the movement of the display device in order to avoid the collision.

Sensor 130 is a device that detects spatial, auditory, visual, or other sensory data about an area proximate to display device 140. In various embodiments, sensor 130 is a camera, proximity sensor, motion detector, microphone, photoreceptor, transmitting apparatus, recording apparatus, or any combination thereof. For example, a first sensor and a second sensor are affixed to a wall proximate to display device 140 and operate to detect sensory data, including visual and proximity data, for the area adjacent to a display screen of display device 140. The first and second sensor send the sensory data to positioning program 104. Based on the sensory data, positioning program 104 detects a viewer set in the area adjacent to the display screen of display device 140. Sensor 130 is in communication with computing device 102. In some embodiments of the present disclosure, sensor 130 is affixed to display device 140 (e.g., on the top, side, bottom, front, back, or elsewhere). In other embodiments, sensor 130 resides within the housing of display device 140. In additional embodiments, sensor 130 resides within the proximity of a viewer set. In some embodiments, sensor 130 represents a plurality of sensors operating individually or as a cluster of sensors. In one example, sensor 130 represents a proximity sensor that sends sensory data to positioning program 104. In another example, a plurality of visual sensors that each send sensory data to positioning program 104. In another embodiment, sensor 130 is a sensor that sends sensory data of multiple types to positioning program 104. For example, sensor 130 represents a sensor that sends both audio and video sensory data to positioning program 104.

Figure 2:
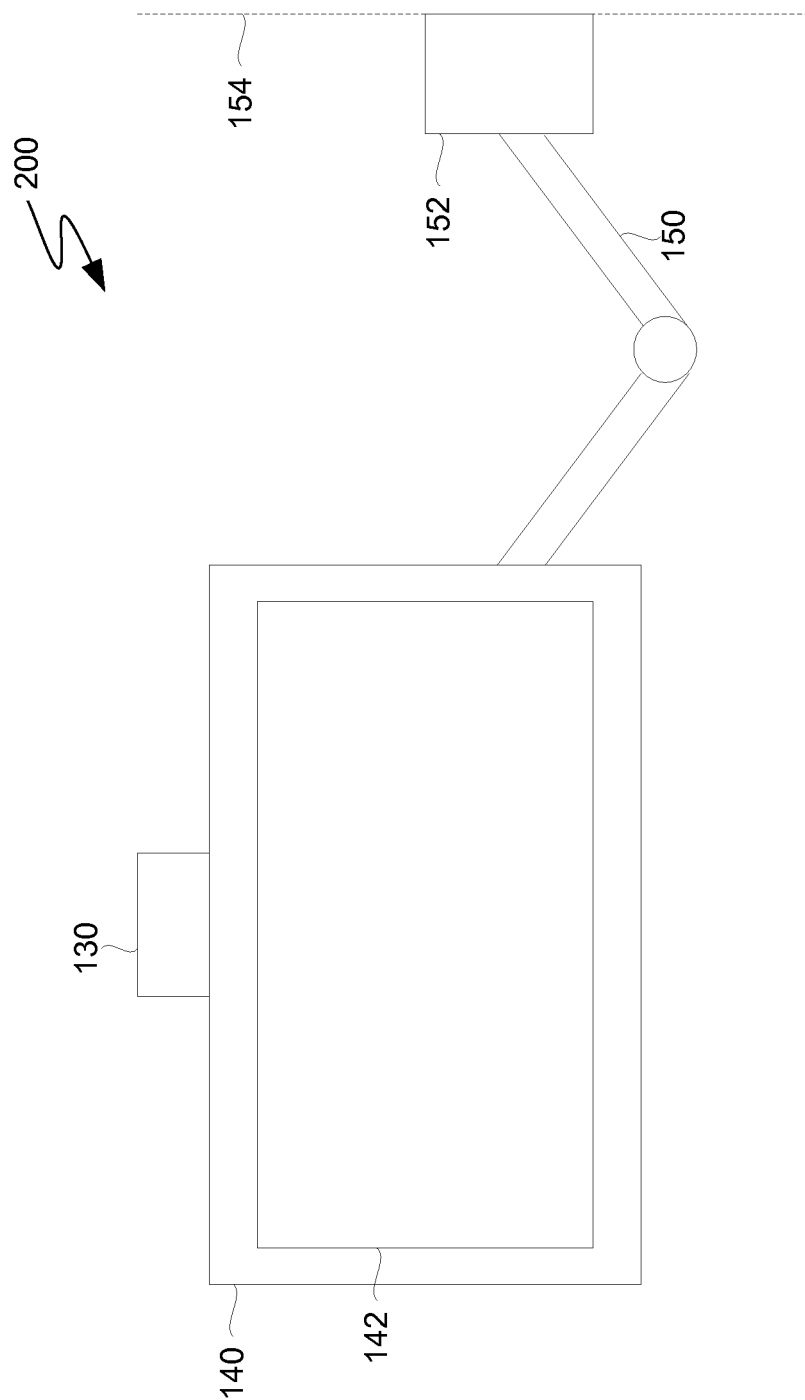
FIG. 2 is a functional block diagram illustrating an example implementation for display positioning, in accordance with an embodiment of the present disclosure.
Figure 3:
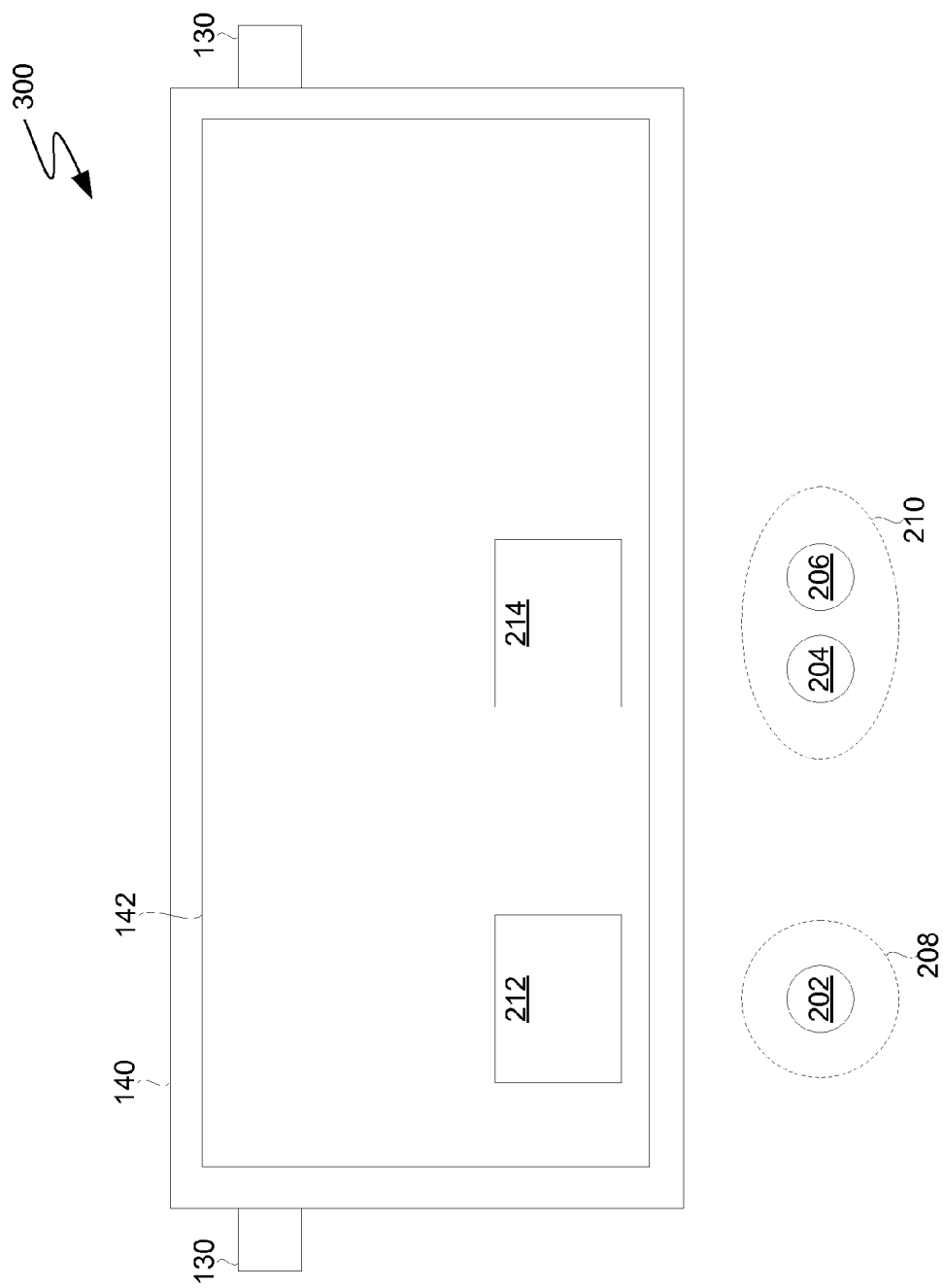
FIG. 3 is a functional block diagram illustrating an example implementation for display positioning, in accordance with an embodiment of the present disclosure.

Display device 140 is a device that displays an image via a display screen (e.g., screen 142, as depicted in FIG. 2 and FIG. 3). In various embodiments, display device 140 is a television set, a monitor, or a large-format display. For example, display device 140 is a device including a liquid-crystal display screen. In one embodiment, as illustrated in the example implementation of FIG. 2, display device 140 is affixed to display position device 150.

Display position device 150 is a device that repositions display device 140 by mechanical force. Display position device 150 is, in various embodiments, an articulating arm, a motorized arm, a motorized display device mount, a rotating surface, or a motorized hinge or set of hinges. In one embodiment, display device 140 is affixed to an end of display position device 150, an opposite end of which is affixed to an anchor point. For example, display position device 150 is an articulating arm that is affixed at one end to a television and at an opposite end to an anchor point on a wall (e.g., anchor 152). Display position device 150 may include one or more mounting brackets complying with one or more industry standards, such as one or more flat display mounting interface standards as promulgated by the video electronics standards association (VESA®). (VESA is a trademark of the video electronics standards association corporation.)

Example implementations of computing environment 100 are depicted by each of FIG. 2 and FIG. 3, as explained in further detail below.

FIG. 2 is a functional block diagram illustrating example implementation 200 for display positioning, in accordance with an embodiment of the present disclosure. Example implementation 200 includes display device 140, sensor 130, and display position device 150. Display device 140 includes screen 142. In one embodiment, positioning program 104 is in communication with display position device 150. In this case, display positioning device 150 operates (e.g., moves) in response to commands received from positioning program 104. In the depicted implementation, display positioning device 150 is an articulating arm that is affixed to display 140 at a first end and to anchor 152 at another end. Anchor 152 is affixed to surface 154. For example, positioning program 104 operates on computing device 102, which resides within a housing of anchor 152, which is affixed to surface 154 (e.g., a wall).

In this example implementation, positioning program 104 operates to control the position of display 140 utilizing display positioning device 150. Positioning program 104 is capable of moving display 140 to and from a variety of positions and orientations, within the full mechanical limits of display positioning device 150. For example, positioning program 104 orients display 140 with the screen 142 facing upwards (that is, opposite the force of gravity) at a height from the ground approximately waist-height (relative to a user), thereby facilitating use of display 140 as a table-like display surface. In one embodiment, positioning program 104 controls the position of display 140 in response to gestures or commands received from a user. In one embodiment, collision monitor 108 operates to detect and help prevent collisions of display 140, display positioning device 150, or both with each other or with other objects including, for example, anchor 152 and surface 154.

In this example implementation, display program 106 resides in computing device 102, which resides in a housing of anchor 152. Display program 106 displays one or more interface elements via screen 142. For example, display program 106 displays a background elements, one or more session elements, one or more user interfaces, or any combination thereof.

FIG. 3 is a functional block diagram illustrating example implementation 300 for display positioning, in accordance with an embodiment of the present disclosure. Example implementation 300 includes display 140, sensors 130, viewer set 208, and viewer set 210. Viewer set 208 includes viewer 202. Viewer set 210 includes viewer 204 and viewer 206. Display 140 includes screen 142, via which display program 106 displays a background element. Display program 106 further displays one or more session elements.

In this example implementation, display 140 includes one or more displays. In one embodiment, display 140 includes a single display with a single screen (e.g., screen 142). In another embodiment, display 140 is a composite display. That is, in this example, display 140 includes a plurality of displays, each with a screen that each display at least a portion of each interface element. For example, display 140 refers to four display devices, in which case screen 142 is a composite of the screens of the four devices. In this embodiment, display program 106 displays all or part of each of one or more interface elements via each screen of each display device comprising screen 142. In one embodiment, display 140 of FIG. 3 is affixed to a display repositioning device (e.g., display repositioning device 150). In this case, positioning program 104 controls the display repositioning device to position and orient display 140. In another embodiment, display 140 is a composite display, in which case one or more of the individual displays comprising display 140 is affixed to a display repositioning device. In this case, positioning program 104 controls each such display repositioning device to position and orient each individual affixed display included in display 140.

A viewer set is a group of at least one or more users who are proximate to a screen of a display device and who are detected by a sensor. As depicted, viewer set 208 and viewer set 210 each include one or more users who are proximate to screen 142 of display 140 and who are detected by sensors 130. In various embodiments, display environment 200 includes a greater or lesser number of viewer sets than depicted, each of which includes a greater or lesser number of users. In other embodiments, a greater or lesser number of session elements is presented for each viewer set. In some embodiments, display program 106 displays no session element for a viewer set.

Figure 4:
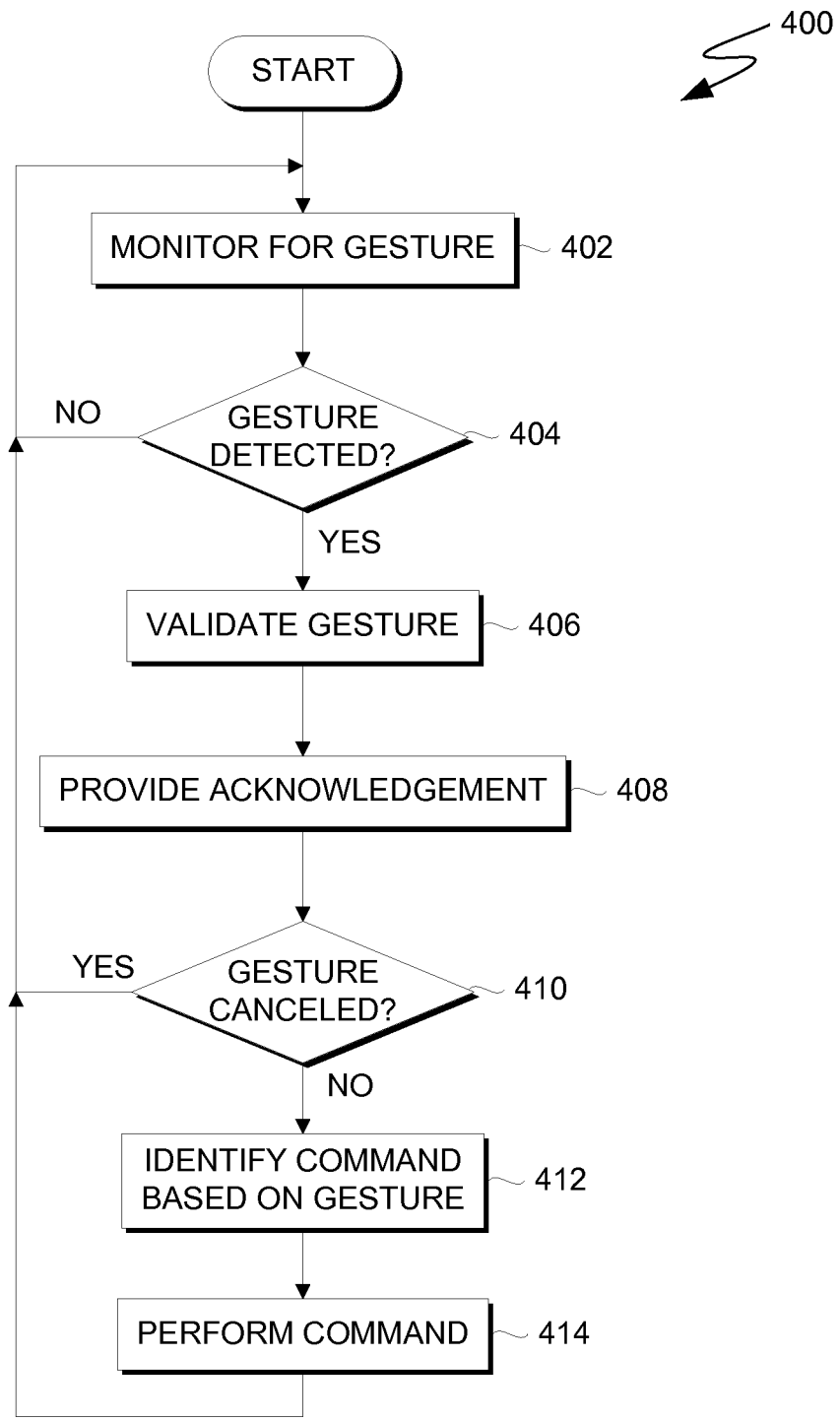
FIG. 4 is a flowchart depicting operations for display device positioning, in accordance with an embodiment of the present disclosure.

FIG. 4 is a flowchart depicting operations 400 for display device positioning, in accordance with an embodiment of the present disclosure. In one embodiment, FIG. 4 depicts operations 400 of positioning program 104 executing on computing device 102 within computing environment 100. For example, positioning program 104 executes operations 400 within example implementation 200. In another example, positioning program 104 executes operations 400 within example implementation 300.

In step 402, positioning program 104 monitors for a gesture. In one embodiment, positioning program 104 monitors sensory data received from at least one sensor (e.g., sensor 130) for a gesture. In various examples, gestures include voice commands or hand motions, arm motions, facial expressions, or other physical gestures. In one embodiment, positioning program 104 operates in active tracking mode. In this case, positioning program 104 monitoring for a gesture of a viewer includes monitoring for changes in a position of the viewer. In active tracking mode, a change in position of a viewer is a gesture that is associated with a command to reposition the display device. For example, positioning program 104, operating in active tracking mode, detects a change in a position of a viewer laterally, with respect to a screen of the display device. Positioning program 104 detects a gesture based on the change in position (see step 406) that corresponds to a command (see step 412) to reposition the display such that the screen is more perpendicular to the viewer.

In one example, positioning program 104, operating in active tracking mode, detects a change in position of a patient lying in a hospital bed. In this case, positioning program 104 repositions display device 140 to improve a viewing angle of the patient in response to the change in position. In another example, a user gives the voice command "move to preset position four." In this case, positioning program 104, operating in gesture detection mode, receives sensory input that represents the voice command, based upon which positioning program 104 detects a gesture that is associated with a command to move display device 140 to preset position four. In response, positioning program 104 repositions display device 140 to preset position four.

In some embodiment, sensory data includes signals from one or more remote controls. Such a signal is, in various examples, a signal via any type of wired or wireless transmission format or type. In one embodiment, positioning program 104 detects a gesture based on a signal transmitted by a remote control to display device 140. For example, a user powers off display device 140 via a remote control. Positioning program 104 detects the signal from the remote control. Based on the signal, positioning program 104 detects a gesture that corresponds to a command to return display device 140 to a preset position.

In decision 404, positioning program 104 determines whether a gesture is detected. In one embodiment, positioning program 104 determines that a gesture is detected in response to detecting sensory data from at least one sensor that matches a pattern of the gesture. For example, positioning program 104 accesses a database of computing device 102 that stores one or more patterns, each of which is associated with a gesture. In this case, positioning program 104 monitors sensory data (see step 402) and detects sensory data having a pattern that matches a pattern stored in the database. Positioning program 104 determines that the gesture associated with the pattern is detected. If positioning program 104 determines that a gesture is detected, positioning program 104 validates the detected gesture (step 406). In one embodiment, positioning program 104 determines that a gesture is not detected in response to detecting no sensory data or, alternatively, in response to detecting sensory data that does not match a pattern associated with a gesture. If positioning program 104 determines that a gesture is not detected, then positioning program 104 returns to monitor for a gesture (step 402).

In step 406, positioning program 104 validates the detected gesture. In one embodiment, positioning program 104 determines whether the gesture detected is valid for the current mode of operation. In various embodiments, the mode of operation includes one or more of active tracking mode, free position mode, and locked position mode, each of which is discussed more fully above. Each such mode of operation is associated with a set of valid gestures. In one embodiment, the set of valid gestures for each mode of operation includes gestures associated with commands to switch to each other mode of operation. For example, the set of valid gestures for free position mode further includes a variety of gestures, each of which is associated with a command to reposition display device 140. In another example, the set of valid gestures for locked position mode further includes a gesture associated with a command to change from one locked position to another locked position. In yet another example, a beckoning gesture is included in the set of valid gestures for free position mode, but not in the set of valid gestures for locked position mode. In this case, if positioning program 104 detects the beckoning gesture while operating in free position mode, then the gesture successfully validates. Conversely, if positioning program 104 detects the beckoning gesture while operating in locked position mode, then gesture fails validation. In one embodiment, a command fails validation if collision monitor 108 determines that executing the command would cause a collision with an obstacle. In various examples, the collision is a collision between at least one of display device 140, display position device 150, and sensor 130 with an obstacle.

In step 408, positioning program 104 provides acknowledgement of the validated gesture. In one embodiment, positioning program 104 provides an acknowledgement of the validated gesture via a screen of display device 140. For example, positioning program 104 identifies the gesture via a display element of screen 142 utilizing display program 106. In one embodiment, positioning program 104 provides acknowledgment of the validated gesture by identifying the gesture and providing at least one user interface element. The at least one user interface element includes one or both of a confirmation element and a cancellation element. In one embodiment, positioning program 104 provides acknowledgement of the gesture for a specified period of time (e.g., three seconds, five seconds or ten seconds). In various examples, the specified period of time is pre-determined, user-specified, algorithmically determined, or a combination thereof. In another embodiment, positioning program 104 provides acknowledgement of the gesture indefinitely (e.g., until a particular event occurs). For example, positioning program 104 provides acknowledgement until positioning program 104 receives user input regarding the gesture.

In decision 410, positioning program 104 determines whether the gesture is cancelled. In one embodiment, positioning program 104 determines whether a gesture is cancelled based on user input. For example, positioning program 104 identifies the validated gesture and provides a confirmation element and a cancellation element via a user interface (see step 408). If positioning program 104 receives an interaction with the confirmation element, then positioning program 104 determines that the gesture is not cancelled. Conversely, if positioning program 104 receives an interaction with the cancellation element, then positioning program 104 determines that the gesture is cancelled. In another embodiment, positioning program 104 determines that the gesture is not cancelled if positioning program 104 receives no cancellation interaction before expiration of the specified period of time during which positioning program 104 provides acknowledgement of the gesture (see step 408). In one embodiment, positioning program 104 receives a cancellation interaction based on a gesture that corresponds to cancellation. For example, positioning program 104 determines that a gesture is cancelled in response to detecting another gesture that corresponds to cancellation, such an up-held "X" formed by a user crossing her forearms in front of her. In this case, positioning program 104 determines that the gesture is cancelled.

In step 412, positioning program 104 identifies a command based on the gesture. In one embodiment, positioning program 104 identifies a command that is associated with the validated gesture. For example, a database of computing device 102 associates commands with gestures. In this case, positioning program 104 accesses the database based on the gesture to identify an associated command.

In step 414, positioning program 104 performs the identified command. The identified command corresponds to one or more of various operations. The identified command is, in various examples, a command to deactivate a first mode of operation and activate a second mode of operation, a command to rotate, tilt, or otherwise reposition display device 140, or a command to enter a preset position.

In some embodiments, positioning program 104 performs a command that corresponds to a detected gesture. In one example, a user performs a gesture that corresponds to a command to activate an active tracking mode. Positioning program 104 detects and identifies the gesture. Positioning program 104 performs the command to activate active tracking mode, in which case positioning program 104 monitors sensory data (e.g., from sensor 130) to detect a change in a position of the user. In response to detecting such a change, positioning program 104 repositions display device 140 such that a screen of the display device (e.g., screen 142) is oriented more toward the user. In another example, a user performs a gesture that corresponds to a command to activate free position mode. Positioning program 104 detects and identifies the gesture. Positioning program 104 performs the command to activate free position mode, in which case positioning program 104 monitors sensory data (e.g., from sensor 130) to detect gestures of the user. In response to detecting such a gesture, positioning program 104 repositions display device 140 according to the command to which the gesture corresponds. In yet another embodiment, positioning program 104 detects a gesture that corresponds to a command to activate a locked position or preset position, which are discussed in further detail herein.

In some embodiments, positioning program 104 performs a command by repositioning display device 140. For example, positioning program 104 performs a command by issuing an instruction to display position device 150. In one embodiment, display position device 150 is an articulating arm to which display device 140 is affixed that positions display device 140 to increase visibility by a viewer of a screen of display device 140. For example, positioning program 104 performs a command to activate active tracking mode, in which case positioning program 104 issues commands to display position device 150 to reposition display device 140 in response to positioning program 104 detecting changes in a position of the viewer.

Figure 5:
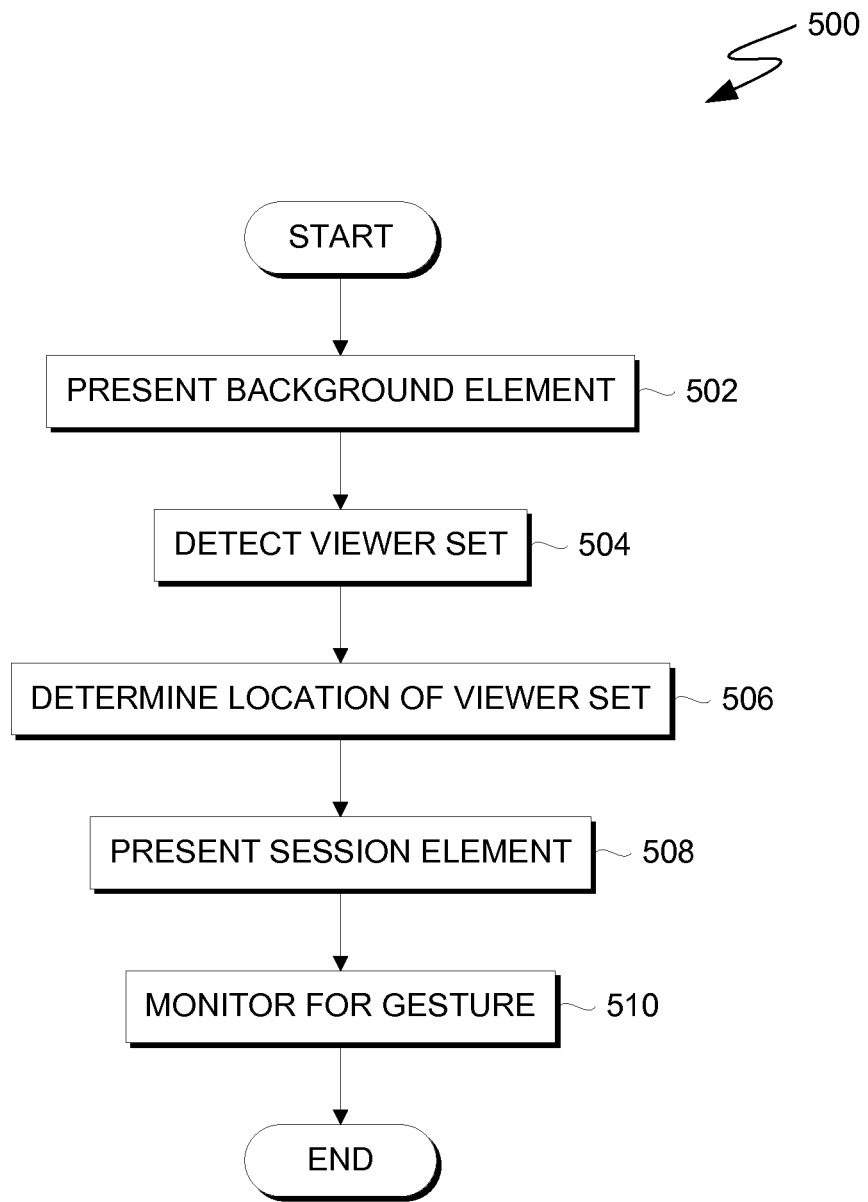
FIG. 5 is a flowchart depicting operations for display element positioning, in accordance with an embodiment of the present disclosure.

FIG. 5 is a flowchart depicting operations for display element positioning, in accordance with an embodiment of the present disclosure. In one embodiment, FIG. 5 depicts operations 500 of display program 106 executing on computing device 102 within computing environment 100. For example, display program 106 executes operations 500 within example implementation 200. In another example, display program 106 executes operations 500 within example implementation 300.

In step 502, display program 106 presents a background element. In one embodiment, display program 106 presents at least one layer of display elements via a screen of a display device. For example, display program 106 presents layers of display elements via screen 142 (see FIG. 3) of display device 140. In this embodiment, a higher layer overlaps a lower layer. In the example implementation depicted by FIG. 3, session element 212 is displayed via a layer that overlaps part of a layer via which a background element is displayed. In one embodiment, the background element is displayed across all visible portions of screen 142. In this example, the background element is displayed via a region of screen 142 that is larger than and that at least partially encompasses session element 212. Further, in this example, session element 212 at least partially occludes visibility of the portion of the background element that session element 212 overlaps. Thus, session element 212 is displayed on top of (or, in other words, in front of) the background element. In one embodiment, the background element is displayed via a layer lower than that of any session elements, meaning that the background element does not overlap or occlude any session elements.

In step 504, display program 106 detects a viewer set. As discussed in further detail above, in one embodiment, a viewer set is a group of at least one or more users who are proximate to a screen of a display device and who are detected by a sensor. Display program 106 detects at least one viewer set. As depicted in the example implementation of FIG. 3, display program 106 detects viewer set 208 and viewer set 210 via sensors 130. In one embodiment, display program 106 detects a viewer set based on one or more criteria. In various examples, the criteria include one or more of: the number of viewers, the proximity of the viewers to one another, the proximity of the viewers to the display device, the proximity of the viewers to one or more sensors, the location of the viewers relative to the display device, a gesture of one or more of the viewers, a duration of time for which the viewers remain in proximity of one another, one or more sensors, or the display device, and a duration of time for which the viewers remain in a given location relative to the display device.

In step 506, display program 106 determines a location of a viewer set. In one embodiment, display program 106 determines the location the detected viewer set (see step 504). In one embodiment, display program 106 detects the location of a viewer set along a horizontal axis of a screen of display device 140. In the example implementation of FIG. 3, display program 106 detects the location of viewer set 208 as being toward the left side of screen 142, approximately as depicted. Further, display program 106 detects the location of viewer set 210 as being toward the center of screen 142, approximately as depicted. In another embodiment, display program 106 determines the location of a viewer set along a plurality of axes. For example, display program 106 determines the location of a viewer set both along a width of display device 140 and along a height of display device 140. In this case, the position of a viewer set along the height varies based upon factors such as the height of the viewers of the viewer set, whether the viewers are in an elevated position, and whether the viewers are standing or seated. In another example, display program 106 determines the location of a viewer set along axes including an axis perpendicular to the screen of the display device. In other words, display program 106 determines the distance between a viewer set and the display device. In one embodiment, display program 106 determines viewer sets among those viewers located within a threshold distance of the display device. For example, a group of viewers moves beyond the threshold distance from the display device. In this case, the group of viewers is not a viewer set.

In step 508, display program 106 presents a session element. In one embodiment, display program 106 displays one or more session elements. For example, in the example implementation depicted by FIG. 3, display program 106 displays session element 212 and session element 214 via screen 142. As discussed above, each session element corresponds to a viewer set. In the example implementation of FIG. 3, session element 212 corresponds to viewer set 208, which includes viewer 202. Further, in the example implementation of FIG. 3, session element 214 corresponds to viewer set 210, which includes viewer 204 and viewer 206.

In one embodiment, display program 106 displays a user interface via a session element. For example, positioning program 104 provides an acknowledgement of a gesture (see step 408) via an interface element of a user interface displayed by display program 106 via a session element. In another embodiment, display program 106 displays content (which is, for example, selected by a user) via a session element. In one embodiment, the size of the session element is positively correlated to the number of viewers in the viewer set. In another embodiment, the size of the session element is positively correlated to the distance between the viewer set and the screen of the display device.

For example, a sporting event is displayed on a large-format display device. Display program 106 presents a background element depicting the sporting event via a screen of the display device. Display program 106 detects a viewer set including three viewers standing situated near the left side of the screen based on data from a sensor located proximate to the display device. In response to a viewer of the viewer set interacting with an interface element (i.e., in response to receiving user input from the viewer), display program 106 presents a session element via the screen based on the location of the viewer set. Display program 106 displays content via the session element that is based on the user input. In this example, the interface element corresponds to statistics of a particular player in the sporting event, based upon which display program 106 displays the player statistics. The session element is superimposed over, and occludes vision of, a portion of the background element. Thus, the viewer set can view the content of the session element without preventing other viewers from viewing the sporting event.

In some embodiments, display program 106 displays, via a session element, content based, at least in part, by features of the viewer set. In one such embodiment, display program 106 detects features of the viewer set based on sensory data from sensor 130. In one example, such features include text or images printed on clothing, accessories, or possessions (e.g., shopping bags) of the viewers. In another example, such features include physical features of each of the viewers or features of the viewer set, such as the number of viewers in the viewer set. In one such embodiment, the content that display program 106 displays via a session element includes advertising or other promotional information. For example, display program 106 displays a session element via a screen of a kiosk in a mall. In this case, display program 106 determines that a viewer of a viewer set is wearing a particular brand of clothing (e.g., by identifying a logo or text printed on the clothing), and display program 106 displays content via the session element that includes directions to a store that sells more clothing of that brand (or, alternatively, clothing of a competing or otherwise related brand).

In one embodiment, the level of a layer is equal to the level of another layer. In the example implementation depicted by FIG. 3, session element 212 and session element 214 are displayed via layers of equal level. Accordingly, neither session element 212 nor session element 214 occlude visibility of one another. In this example, display program 106 prevents session element 212 and session element 214 from overlapping, such as by repositioning, truncating, resizing, or otherwise modifying one or both of session element 212 and session element 214. In another embodiment, session elements are displayed via layers of unequal level relative to one another. For example, session element 212 is displayed via a level lower than that by which session element 214 is displayed. In this case, session element 214 at least partially occludes visibility of session element 212 if session element 214 overlaps session element 212.

In step 510, display program 106 monitors for a gesture. In one embodiment, display program 106 monitors for a gesture by initializing, calling, or otherwise causing operation of positioning program 104 (see step 402).

In some embodiments, one or both of positioning program 104 and display program 106 operate to reposition a session element. In one such embodiment, positioning program 104 monitors the position of a viewer set and, in response, repositions a display device, a session element presented via a screen of the display device, or both. For example, display device 140 represents a composite display device comprising a plurality of component display devices. Display program 106 presents a session element corresponding to a detected viewer set via a screen of a first component display device. Positioning program 104 repositions the first component display device toward the detected viewer set with the screen facing upwards at a forty-five degree angle and with the component display device at an elevation approximately equal to two thirds of the average height of the viewers of the detected viewer set. In another such embodiment, display program 106 repositions a session element based on a gesture detected by positioning program 104. For example, display program 106 presents a session element. Positioning program 104 detects a change in the position of the viewer set. In response, display program 106 presents the session element based on the changed position of the viewer set. In various examples, one or both of positioning program 104 and display program 106 reposition a session element by moving a presented session element or ceasing presentation of a session element in a first location and presenting the session element in a second location.

In one embodiment, positioning of the device is limited to a pre-determined region (e.g., a pre-determined distance from the viewer, or a pre-determined range of angles relative to the viewer). For example, a person cooking dinner views a recipe on a screen while cooking. Positioning program 104, in response to a gesture of the person, positions the screen at a specified distance from the person cooking. In this example, as the person moves toward or away from the display, positioning program 104 positions the display to maintain the specified distance between the person and the screen. Alternatively, positioning program 104 positions the screen at the specified distance from the person cooking and activates a locked position. In some embodiments, the pre-determined region to which the positioning of the device is limited excludes positions in which the display collides with obstacles (e.g., walls). See the below discussion of the collision detection subroutine for details.

In one embodiment, positioning program 104 operates under free position mode. In free position mode, positioning program 104 receives gestures from a user. In free position mode, positioning program 104 positions the display in response to detecting a gesture. In one embodiment, positioning program 104 positions the display by operation of display position device 150. In one embodiment, positioning program 104 activates free position mode and sensor 130 detects user gestures. For example, a user says "activate free position mode" and positioning program 104 registers the voice command. In one embodiment, positioning program 104 displays a gesture override screen via GUI 108. For example, GUI 108 displays the gesture override screen for three seconds.

In one embodiment, positioning program 104 saves display positions selected by a user as preset positions. In such an embodiment, a default display position is stored by, for example, computing device 102. In one embodiment, preset positions can be selected via user gestures. For example, a surgeon mid-surgery says "go to position six" to view a screen showing details of the surgery from a different angle to improve a viewing direction of the screen while operating. In this example, positioning program 104 adjusts the display to a preset position identified as position six. In another embodiment, positioning program 104 displays a menu (e.g., via GUI 108) that includes a range of preset (e.g., saved) positions. For example, a user selects a preset position from the menu via a user interaction with GUI 108 (e.g., a touch interaction or a gesture). In another embodiment, the user selects a new display position not already specified as a preset position. For example, a user selects a new position via additional gestures, such as a beckoning gesture with both hands. In response, positioning program 104 moves the display closer to the user. Further, the user performs a second gesture corresponding to a save command and, in response, positioning program 104 saves the new display position as a preset. In another example, a manager is conducting a meeting within the entire department. In this case, the manager uses the display screen as an interactive table for employees to enter feedback. The manager saves the specified position of the display as a preset position.

Figure 6:
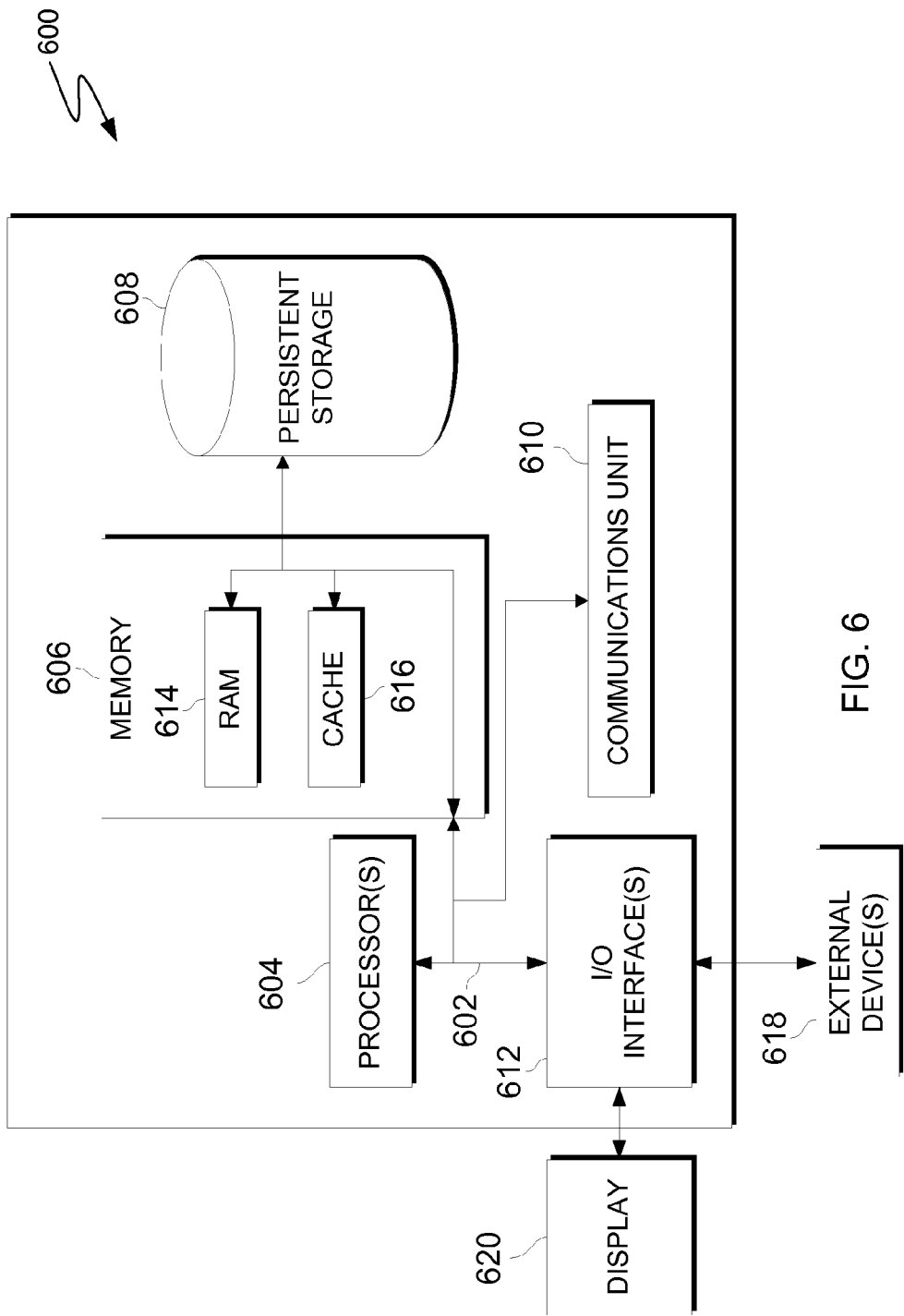
FIG. 6 is a block diagram of components of a computing device executing operations for display positioning, in accordance with an embodiment of the present disclosure.

FIG. 6 is a block diagram of components of the computing device executing operations for executing positioning program 104 and display program 106, in accordance with an embodiment of the present disclosure. For example, FIG. 6 is a block diagram of computing device 102 within computing environment 100 executing operations of positioning program 104.

It should be appreciated that FIG. 6 provides only an illustration of one implementation and does not imply any limitations with regard to the environments in which different embodiments may be implemented. Many modifications to the depicted environment may be made.

Computing device 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Positioning program 104 is stored in persistent storage 608 for execution and/or access by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 120. In these examples, communications unit 610 includes one or more network interface cards. Communications unit 610 may provide communications through the use of either or both physical and wireless communications links. Positioning program 104 may be downloaded to persistent storage 608 through communications unit 610.

I/O interface(s) 612 allows for input and output of data with other devices that may be connected to computing device 102. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present invention (e.g., positioning program 104 can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for display repositioning, comprising:
    detecting, by one or more processors, a viewer set based, at least in part, on sensory data received from one or more sensors, wherein the viewer set includes one or more viewers of a display device;
    determining, by one or more processors, a location of the viewer set relative to a screen of the display device based, at least in part, on the sensory data, wherein a location of the viewer set includes a first distance and a first angle;
    determining, by one or more processors, that the display device is in a locked position mode;
    presenting, by one or more processors, a first interface element via the screen, wherein the first interface element has a location based, at least in part, on the location of the viewer set and wherein the first interface element has a size based, at least in part, on the location of the viewer set;
    presenting, by one or more processors, a second interface element via the screen, wherein the first interface element partially overlaps the second interface element;
    detecting, by one or more processors, a first gesture of at least one viewer of the viewer set;
    modifying, by one or more processors, the first interface element based, at least in part, on the first gesture such that the first interface element does not overlap the second interface element;
    switching, by one or more processors, a position mode of the display device from the locked position mode to a free position mode based, at least in part, on the first gesture of the at least one viewer of the viewer set; and
    repositioning, by one or more processors, the display device.

2. The method of claim 1, further comprising:
    repositioning, by one or more processors, the first interface element based, at least in part, on a gesture of at least one viewer of the viewer set.

3. The method of claim 1, wherein detecting the viewer set is further based, at least in part, on the one or more viewers remaining within a pre-determined proximity relative to the display device for a pre-determined duration of time.

4. The method of claim 1, wherein the display device is a composite display device comprising a plurality of component display devices, wherein the first interface element is displayed via at least one first component display device, and wherein the second interface element is displayed via at least one second component display device.

5. The method of claim 1, further comprising:
    validating, by one or more processors, the gesture based, at least in part on the gesture, and the position mode of the display, wherein the gesture includes, at least, a command to switch from a locked position mode to a free position mode, and wherein the gesture includes, at least, a command to move the display device closer to the at least one viewer of the viewer set.

6. The method of claim 1, further comprising:
    determining, by one or more processors, that a collision involving the display device is imminent; and
    adjusting, by one or more processors, a position of the display device to avoid the collision.

7. The method of claim 1, wherein detecting the first gesture further includes:
    determining, by one or more processors, the position mode of the display device; and
    determining, by one or more processors, the first gesture is a valid gesture for the position mode of the display device.

8. A computer program product for display repositioning, the computer program product comprising:
    a computer readable storage medium and program instructions stored on the computer readable storage medium, the program instructions comprising:
        program instructions to detect a viewer set based, at least in part, on sensory data received from one or more sensors, wherein the viewer set includes one or more viewers of a display device;
        program instructions to determine a location of the viewer set relative to a screen of the display device based, at least in part, on the sensory data, wherein a location of the viewer set includes a first distance and a first angle;
        program instructions to determine that the display device is in a locked position mode;
        program instructions to present a first interface element via the screen, wherein the first interface element has a location based, at least in part, on the location of the viewer set and wherein the first interface element has a size based, at least in part, on the location of the viewer set;

program instructions to present a second interface element via the screen, wherein the first interface element partially overlaps the second interface element;

program instructions to detect a first gesture of at least one viewer of the viewer set;

program instructions to modify the first interface element based, at least in part, on the first gesture such that the first interface element does not overlap the second interface element;

program instructions to switch a position mode of the display device from the locked position mode to a free position mode based, at least in part, on the first gesture of the at least one viewer of the viewer set; and program instructions to reposition the display device.

9. The computer program product of claim 8, wherein the program instructions further comprise:

program instructions to reposition the first interface element based, at least in part, on a gesture of at least one viewer of the viewer set.

10. The computer program product of claim 8, wherein program instructions to detect the viewer set are further based, at least in part, on the one or more viewers remaining within a pre-determined proximity relative to the display device for a pre-determined duration of time.

11. The computer program product of claim 8, wherein the program instructions further comprise:

program instructions to validate the gesture based, at least in part on the gesture, and the position mode of the display, wherein the gesture includes, at least, a command to switch from a locked position mode to a free position mode, and wherein the gesture includes, at least, a command to move the display device closer to the at least one viewer of the viewer set.

12. The computer program product of claim 8, wherein the display device is a composite display device comprising a plurality of component display devices, wherein the first interface element is displayed via at least one first component display device, and wherein the second interface element is displayed via at least one second component display device.

13. The computer program product of claim 8, further comprising:

program instructions to determine that a collision involving the display device is imminent; and program instructions to adjust a position of the display device to avoid the collision.

14. The computer program product of claim 8, wherein program instructions to detect the first gesture further include:

program instructions to determine the position mode of the display device; and program instructions to determine the first gesture is a valid gesture for the position mode of the display device.

15. A computer system for display repositioning, the computer system comprising:

one or more computer processors;

one or more computer readable storage media;

program instructions stored on the computer readable storage media for execution by at least one of the one or more processors, the program instructions comprising:

program instructions to detect a viewer set based, at least in part, on sensory data received from one or more sensors, wherein the viewer set includes one or more viewers of a display device;

program instructions to determine a location of the viewer set relative to a screen of the display device based, at least in part, on the sensory data, wherein a location of the viewer set includes a first distance and a first angle;

program instructions to determine that the display device is in a locked position mode;

program instructions to present a first interface element via the screen, wherein the first interface element has a location based, at least in part, on the location of the viewer set and wherein the first interface element has a size based, at least in part, on the location of the viewer set;

program instructions to present a second interface element via the screen, wherein the first interface element partially overlaps the second interface element;

program instructions to detect a first gesture of at least one viewer of the viewer set;

program instructions to modify the first interface element based, at least in part, on the first gesture such that the first interface element does not overlap the second interface element;

program instructions to switch a position mode of the display device from the locked position mode to a free position mode based, at least in part, on the first gesture of the at least one viewer of the viewer set; and program instructions to reposition the display device.

16. The computer system of claim 15, wherein the program instructions further comprise:

program instructions to reposition the first interface element based, at least in part, on a gesture of at least one viewer of the viewer set.

17. The computer system of claim 15, wherein program instructions to detect the viewer set are further based, at least in part, on the one or more viewers remaining within a pre-determined proximity relative to the display device for a pre-determined duration of time.

18. The computer system of claim 15, wherein the program instructions further comprise:

program instructions to validate the gesture based, at least in part on the gesture, and the position mode of the display, wherein the gesture includes, at least, a command to switch from a locked position mode to a free position mode, and wherein the gesture includes, at least, a command to move the display device closer to the at least one viewer of the viewer set.

19. The computer system of claim 15, wherein the display device is a composite display device comprising a plurality of component display devices, wherein the first interface element is displayed via at least one first component display device, and wherein the second interface element is displayed via at least one second component display device.

20. The computer system of claim 15, further comprising:

program instructions to determine that a collision involving the display device is imminent; and program instructions to adjust a position of the display device to avoid the collision.

* * * * *